United States Patent [19]

Rickenbacher

[11] 3,758,518

[45] Sept. 11, 1973

[54] CHLORINATED ALPHA-AMINOANTHRAQUINONES AND PROCESS FOR THEIR MANUFACTURE

[75] Inventor: Hans Rudolf Rickenbacher, Basel, Switzerland

[73] Assignee: Ciba-Geigy AG, Basel, Switzerland

[22] Filed: Jan. 4, 1971

[21] Appl. No.: 103,787

Related U.S. Application Data

[63] Continuation-in-part of Ser. No. 798,787, Feb. 12, 1969, abandoned, which is a continuation-in-part of Ser. No. 488,242, Sept. 17, 1965, abandoned.

[30] Foreign Application Priority Data

Sept. 29, 1964 Switzerland........................ 12682/64
Aug. 23, 1965 Switzerland........................ 11824/65

[52] U.S. Cl........... 260/381, 260/256.4 Q, 260/303, 260/377, 260/380
[51] Int. Cl. ........................ C08b 1/22, C09b 1/50
[58] Field of Search...................... 260/303, 256.4 Q

[56] References Cited
FOREIGN PATENTS OR APPLICATIONS

| | | | |
|---|---|---|---|
| 878,647 | 6/1953 | Germany | 260/381 |
| 1,228,274 | 11/1966 | Germany | 260/381 |
| 1,094,503 | 12/1967 | Great Britain | 260/381 |

OTHER PUBLICATIONS

Venkatargman, Synthetic Dyes, p. 69, 1952
Adams et al., J. Am. Chem Soc, 74, 3171, 1952
Chau et al., J. Org. Chem., 26, 1074, 1961

*Primary Examiner*—Lorraine A. Weinberger
*Assistant Examiner*—Robert Gerstl
*Attorney*—Harry Goldsmith, Joseph G. Kolodny and Mario A. Monaco

[57] ABSTRACT

The invention relates to a process for the manufacture of a chlorine containing aminoanthraquinone, wherein a 1-monoaminoanthraquinone is subjected to the action of chlorine in the presence of N-methyl-pyrrolidone or a carboxylic acid amide of the formula

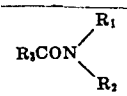

in which $R_1$ and $R_2$ denote alkyl or cycloalkyl groups of the groups $R_1$ and $R_2$ together with the nitrogen atom may form a 5- or 6-membered heterocyclic ring and $R_3CO$- represents the radical of an aliphatic-carboxylic acid.

7 Claims, No Drawings

CHLORINATED ALPHA-AMINOANTHRAQUINONES AND PROCESS FOR THEIR MANUFACTURE

This is a continuation-in-part application of our copending application Ser. No. 798,787, filed Feb. 12, 1969, now abandoned; application Ser. No. 798,787 is in turn a continuation-in-part of application Ser. No. 488,242, filed Sept. 17, 1965, now abandoned.

Whereas the preparation of 1-amino-2,4-dibromoanthraquinone by bromination of 1-aminoanthraquinone in aqueous suspension takes place smoothly, no technically usable process for the preparation of 1-amino-2,4-di-chloroanthraquinone was hitherto known. According to Friess and Auffenberg (Berichte 53, 23 (1920) predominantly nitrogen-free products are obtained by the chlorination of 1-aminoanthraquinone in glacial acetic acid at room temperature. According to Bedekar and Venkataraman (British Patent Specification 634,646) the chlorination of 1-aminoanthraquinone in glacial acetic acid at 100° is said to give 1-amino-2,4-dichloro-anthraquinone, but the crude product is contaminated with by-products and a product of sufficient purity is only obtained by recrystallisation from solvent naphtha. Pure 1-amino-2,4-dichloroanthraquinone of melting point 205° to 206° was obtained by Gubelmann et al. (Ind.Eng.-Chem.21,1231 (1929)) by a circumstantial route via a Friedel-Crafts synthesis starting from phthalic anhydride and meta-dichlorobenzene, nitration of the dichloro-o-benzoylbenzoic acid, reduction of the nitro-compound to the amine and ring closure of the latter to give 1-amino-2,4-dichloroanthraquinone. Furthermore according to German Patent Specification 115,048 1-amino-2,4-dichloroanthraquinone is said to be obtainable by chlorination of 1-aminoanthraquinone in nitrobenzene. The product obtained however has a melting point of 217° to 219° and thus cannot be identical with 1-amino-2,4-dichloroanthraquinone. Summarising, Kirk-Othmer writes in his Encyclopedia of Chemical Technology, 2nd Edition (1963), Vol.2: "The dichlorination of 1-amino-anthraquinone normally does not succeed though individual patents claim that this reaction is possible under certain conditions. The poor results which are obtained by the action of chlorine on 1-aminoanthraquinone are partly attributable to the destructive effect of the chlorine, so that nitrogen-free products are obtained."

It is also known from the patent literature that during the chlorination of 1-aminoanthraquinone in an inert solvent for example benzene, a pentachloro-α-chloroketimidotetrahydroanthraquinone is produced by addition of chlorine to the double bonds of the anthraquinone structure (see German Patent Specifications No. 400,254 and 419,814).

The only technically usable method for the chlorination of an aminoanthraquinone hitherto known comprises protecting the amino-group by acylation and submitting the acylaminoanthraquinone to chlorination. The chlorinated amine is obtained by saponification of the chlorinated acylaminoanthraquinone. As an example of this method attention is directed to German Patent Specification No. 518,406 according to which the 1-benzoyl-aminoanthraquinone obtained by benzoylation of 1-amino-anthraquinone in nitrobenzene is chlorinated to 1-benzoylamino-4-chloroanthraquinone either by means of chlorine or of sulphuryl chloride, and this compound is then converted into 1-amino-4-chloro-anthraquinone by saponification. This process is not only very circumstantial, but it is also necessary to use a large excess of chlorinating agent.

This invention is based on the observation that chlorinated α-aminoanthraquinones can be obtained in high yield and purity by chlorinating an α-aminoanthraquinone in the presence of a carboxylic acid amide, in which the amide nitrogen atom is derived from a secondary amine.

Both mono- and diaminoanthraquinones may be considered as α-aminoanthraquinones to be used in this process but 1-aminoanthraquinone must first be mentioned because of its great technical importance, then 1-aminoanthraquinones which are substituted in the anthraquinone nucleus, for example by halogen atoms, hydroxyl, lower alkyl, for example, methyl or ethyl, or acylamino groups, and aminoanthraquinones alkylated at the nitrogen atom, as well as aminoanthraquinenes in which the anthraquinone group carries a fused heterocyclic 5- or 6-membered ring, for example a thiazole or pyrimidine ring. The following may be quoted as examples:
1-amino-5-chloroanthraquinone, 1-amino-6-chloroanthraquinone, 1-amino-7-chloroanthraquinone, 1-amino-8-chloroanthraquinone, 1-amino-6,7-dichloroanthraquinone, 1-amino-2-methyl-anthraquinone, 1-amino-5-acetylaminoanthraquinone, 1-amino-5-benzoyl-aminoanthraquinone, 1-methylaminoanthraquinone, 5-amino-1,9-isothiazoleanthrone, 4-amino-1,9-anthrapyrimidine.

Among the diaminoanthraquinones, particular mention should be made of those whose amino groups are situated in different benzene rings of the anthraquinones nucleus, e.g. 1,5- and 1,8-diaminoanthraquinone, 1,5-diamino-4,8-dihydroxy- and 1,8-diamino-4,5-dihydroxyanthraquinone.

Carboxylic acid amides to be used are preferably amides of aliphatic carboxylic acids, particularly of formic acid, or those of formula

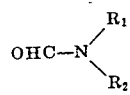

in which $R_1$ and $R_2$ denote low alkyl groups, or in which the groups $R_1$ and $R_2$ together with the nitrogen atom may also form a heterocyclic five- or six-membered ring, for example a piperidine, morpholine piperazine or pyrrolidine ring. The following amides may be quoted as examples:
dimethylformamide, diethylformamide, dibutylformamide, dihexylformamide, N-methyl-N-cyclohexylformamide, dicyclohexylformamide, dioctylformamide, didecylformamide, didodecylformamide, dimethylacetamide, dibutylacetamide, dicyclohexylacetamide, dimethylbutyramide, dimethyl-capronamide, dimethyllauryl-amide, N,N,N', N'-tetramethyl-oxamide, N-formylpiperidine, N-formylmorpholine N-formylpyrrolidine, and N-methylpyrrolidone, N,N'-diformylpiperazine. Tetraalkylurea, especially tetramethylurea, is also a useful agent.

The amount of amide to be used may vary within very wide limits, the reaction being carried out if desired in the presence of a solvent. Furthermore, it is possible for example to dissolve the aminoanthraquinone in dimethylformamide, with at least 2, and preferably three parts, of the amide being used per part of the aminoanthraquinone, and to pass the chlorine into this solution. It is also possible, and in some casses preferable, to dissolve or suspend the aminoanthraquinone in an inert organic solvent, e.g. chlorobenzene, o-dichlorobenzene or nitrobenzene, and to add the amide to the mixture. In this embodiment considerably smaller amounts of the amide suffice.

Elementary chlorine is preferably used as the chlorinating agent, but it is also possible to use chlorine-yielding agents as e.g. sulphuryl chloride. Preferably the theoretical amount of chlorine, or a small excess, for example about 5 percent, is used. The chlorination takes place very rapidly at room temperature and the dichlorinated monoaminoanthraquinones or the tetrachlorinated diaminoanthraquinones are generally obtained. If a larger excess of chlorine is used it is also possible to obtain higher chlorinated aminoanthraquinones, for example the hitherto unknown 1-amino-2,3,4-trichloroanthraquinone, 1,5-diamino-2,3,4,6,7,8-hexachloroanthraquinone or 1,8-diamino-2,3,4,5,6,7,-hexachloroanthraquinone.

The chlorination is advantageously carried out at temperatures below 50°, preferably below 20°. The maintenance of these temperatures requires intensive cooling of the reaction mixture. Towards the end of the chlorination it is advisable to warm the mixture in order to complete the reaction. Very astonishingly even at temperatures of −60°C the chlorination occurs with immeasurably high speed.

Since the chlorination products are only slightly soluble in the solvent they generally precipitate when the reaction is complete and can be separated from the solvent by filttration.

The chlorinated $\alpha$-aminoathraquinones are valuable dyestuff intermediates and are obtained in a degree of purity such that they may be used for the synthesis of dyestuffs without further purification.

The following Examples illustrate the invention, the parts and percentages being by weight unless otherwise stated, and the temperatures are quoted in degree Centigrade.

EXAMPLE 1

A mixture of 948 parts (1,00 parts by volume) of dimethylformamide and 223 parts of 1-aminoanthraquinone were cooled to between 0° and 5° (ice/common salt bath) in a glass apparatus equipped with stirrer, gas inlet tube, thermometer and reflux condenser. 149 Parts of chlorine were passed in during four hours at this temperature. The temperature was then increased over one hour up to 60° – 65° and the mixture maintained within this temperature range for one hour. It was then allowed to cool to room temperature and filtered. The filter cake was washed with 120 parts of dimethylformamide followed by 2,500 parts of water. 262 Parts by weight of dry 1-amino-2,4-dichloro-anthraquinone were obtained which corresponded to 90 percent of the theoretical yield. The chlorine content was 24.60 percent (theoretical: 24.35 percent). The melting point was around 197° – 201° and rose to corrected figure of 205° to 206° after three recrystallisations from chlorobenzene. The crude product had a 95-97 percent purity based on a comparison of the infra red spectra of the crude product and the pure product.

EXAMPLE 2

150 parts of gaseous chlorine were passed during four hours into a mixture of 900 parts of chlorobenzene, 100 parts of dimethylformamide and 223 parts of 1-amino-anthraquinone stirred at 20° to 25°. The mixture was then warmed to 50° to 55° and stirred for one hour at that temperature. After cooling to 20° to 25°, the mixture was filtered and the filter residue washed with 270 parts of chlorobenzene. Solvent still adhering to the filter cake was removed by steam distillation; the product was filtered, washed with water and dried.

The yield was 250 – 262 parts or 85 – 90 percent of theoretical. The melting point of the product obtained in about the same purity as that of Example 1 was between 191° – 195° and 194° – 202°.

In order to purify the crude product, 100 parts of it were dissolved in 1,000 parts of concentrated sulphuric acid and water added dropwise until a sulphuric acid concentration of 75 percent was reached. The mixture was filtered on a glass filter, washed with 100 parts of 70 percent sulphuric acid, stirred with 1,000 parts of water, again filtered, washed on the filter until neutral and dried at 120°. The melting point of the product, which was obtained in a yield of 86 parts, was then about 202° – 205°. The pure product was obtained by recrystallization from 860 parts of chlorobenzene, in a yield of 77 parts, in the form of brownish red glistening needles m.p. 205.5° – 206.5°.

EXAMPLE 3

37.5 g of chlorine were passed during four hours into a mixture of 250 parts by volume of diethylformamide and 56 parts of 1-aminoanthraquinone stirred at 0° – 5°. After working up as in Example 1, a product was obtained of m.p. 196° – 200° in a yield of 64.3 parts, or 88 percent of theoretical.

When N-formylpiperidine or N-formylmorpholine were used instead of diethylformamide, 1-amino-2,4-dichloroanthraquinone was obtained in similar yield.

EXAMPLE 4

37.5 Parts of chlorine were passed during four hours into a mixture of 250 parts by volume of dimethylacetamide and 56 parts of 1-aminoanthraquinone stirred at 0° – 5°. After working up as in Example 1, a product was obtained of m.p. 201° – 204°, in a yield of 54 parts or 74 percent of theoretical.

EXAMPLE 5

75 Parts of chlorine were passed during four hours into a mixture of 250 parts by volume of N-methylpyrrolidone and 56 parts of 1-aminoanthraquinone stirred at 0° – 5°. After working up as in Example 1, the product was obtained in a yield of 62 parts or 85 percent of theoretical. The melting point was about 188° – 195°; pure 1-amino-2,4-dichloroanthraquinone was obtained from this by recrystallisation from chlorobenzene.

EXAMPLE 6

A mixture of 200 parts by volume of dimethylformamide, 44.6 parts of 1-aminoanthraquinone and 56.7 parts of sulphuryl chloride was warmed to 80° with stirring, maintained at that temperature for one hour, warmed to 130° – 135° during a further hour, and stirred for a further four hours at this temperature. The mixture was filtered at room temperature, and washed with 30 parts of dimethylformamide followed by water. The yield was 31 parts or 53 percent of theoretical (m.p. 152° – 182°). 1-amino-2,4-dichloroanthraquinone was obtained by recrystallisation from chlorobenzene.

EXAMPLE 7

42 Parts of chlorine were passed during four hours into a mixture of 200 parts of dimethylformamide and 44.6 parts of 1-aminoanthraquinone stirred at 15° – 20°. Thereafter the mixture was stirred for a further hour at 60° – 65°, cooled to room temperature and filtered. The filter cake was washed with 25 parts dimethylformamide followed by water. A crude product of m.p. 212° – 225° was obtained in a yield of 47 parts. The pure 1-amino-2,3,4-trichloroanthraquinone of m.p. 256° – 257° was obtained by recrystallising three times, each time using 10 parts of chlorobenzene per part of reaction product.

Nitrogen: calc. 4.29 percent; found: 4.34 percent
Chlorine: calc. 32.58 percent; found: 32.64 percent A melting point of 210° is given for the 1-amino-trichloroanthraquinone obtainable according to German Patent Specification 420,754.

EXAMPLE 8

30 Parts of chlorine were passed during eight hours into a mixture of 180 parts of nitrobenzene, 20 parts of dimethylformamide and 44.6 parts of 1-aminoanthraquinone stirred at 20° – 25°. The mixture was then stirred for a further hour at 50° – 55° and filtered at room temperature. The filter cake was washed with 30 parts of nitrobenzene and subsequently steam-distilled to remove the solvent. After filtration, washing with water and drying, the crude product containing 36.8 percent chlorine was obtained in a yield of 54.6 parts or 83 percent of theoretical. The pure 1-amino-2,3,4-trichloroanthraquinone was obtained by recrystallisation from chlorobenzene.

EXAMPLE 9

37.5 Parts of chlorine were passed during four hours into a mixture of 250 parts by volume of dimethylformamide and 64.5 parts of 1-amino-5-chloroanthraquinone stirred at 0° – 5°. After working up as in Example 1 the new product, which was very probably 1-amino-2,4,5-tri-chloroanthraquinone, was obtained in a yield of 69 parts or 85 percent of theoretical. The melting point of the crude product (221° – 225°) rose to 234° – 236° on alternate crystallisation from sulphuric acid (75 percent concentration) and recrystallisation from chlorobenzene.

Nitrogen: found: 4.47 percent;
Chlorine: found: 32.61 percent.

EXAMPLE 10

37.5 Parts of chlorine were passed during four hours into a mixture of 250 parts by volume of dimethylformamide and 64.5 parts of 1-amino-8-chloroanthraquinone stirred at 0° – 5°. After working up as in Example 1 the new product, which was very probably 1-amino-2,4,8-tri-chloroanthraquinone, was obtained in a yield of 66 parts of 82 percent of theoretical. The melting point of the crude product (246° – 250°) rose to 264.5° – 266° on alternate crystallisation from sulphuric acid (75 percent concentration) and recrystallisation from chlorobenzene.

Nitrogen: found: 4.44 percent;
Chlorine: found: 32.86 percent.

EXAMPLE 11

19 Parts of chlorine were passed during four hours into a mixture of 250 parts by volume of dimethylformamide and 59.3 parts of 1-amino-2-methylanthraquinone stirred at 0° – 5°. After working up as in Example 1 the chlorinated product was obtained in a yield of 58.8 parts or 87 percent of theoretical. The melting point of the crude product (241° – 250°) rose to 266° – 267° on alternate crystallisation from sulphuric acid (75 percent concentration) and recrystallisation from chlorobenzene. A melting point of 255° – 256° is given for 1-amino-2-methyl-4-chloroanthraquinone in the literature (German Patent Specification 131,402).

Nitrogen; calc. 5.16 percent; found: 4.92 percent
Chlorine: calc. 13.05 percent; found: 13.14 percent.

EXAMPLE 12

227 Parts of chlorine were passed during six hours into a mixture of 1,200 parts by volume of dimethylformamide and 119 parts of 1,5-diaminoanthraquinone stirred at 0° – 5°. After working up as in Example 1, 163 parts of a reddish brown powder were obtained. On the basis of analytical results (found: nitrogen 6.7 percent, chlorine 45.1 percent) it was a mixture of about equal parts of pentachloro-1,5-diaminoanthraquinone and hexachloro-1,5-diaminoanthraquinone. The melting point of the product was greater than 360°.

EXAMPLE 13

1,8-Diaminoanthraquinone was chlorinated in dimethylformamide as described in Example 12. 124 Parts of a reddish brown powder (found: nitrogen 6.7 percent, chlorine 44.8 percent) were obtained. On the basis of analytical data this was a mixture of about equal parts of pentachloro- and hexachloro-1,8-diaminoanthraquinone.

EXAMPLE 14

149 Parts of chlorine were passed during four hours into a mixture of 1,200 parts by volume of dimethylformamide and 119 parts of 1,5-diaminoanthraquinone stirred at 0°–5°. On working up as in Example 1, 142 parts of a reddish brown powder (found: chlorine 39.2 percent) were obtained. Reddish brown bronzy needles of m.p. 349° – 356° were obtained by recrystallisation from nitrobenzene. The chlorine content remained virtually unchanged on recrystallisation (found: nitrogen 7.3 percent, chlorine 39.6 percent). The calculated figures for a tetrachloro-diaminoanthra-quinone are:

calc: Nitrogen 7.45 percent, Chlorine 37.77 percent.

EXAMPLE 15

118 Parts of tetrachloro-1,8-diaminoanthraquinone (found: chlorine 37.8 percent, calc: chlorine 37.77 percent) were obtained by chlorinating 1,8-diaminoanthraquinone as described in Example 14. The product purified by crystallisation from sulphuric acid (75 percent concentration) had a melting point of 283° – 291°.

EXAMPLE 16

31.4 Parts of chlorine were passed during four hours into a mixture of 200 parts by volume of dimethylformamide and 68.4 parts of monobenzoyl-1,5-diamino-anthraquinone stirred at 0° – 5°. On working up as in Example 1, 72.9 parts (89 percent of theoretical) of an orange powder were obtained. (Chlorine: calc: 17.25 percent, found: 17.4 percent). The pure material was obtained by recrystallising from chlorobenzene several times.

M.P.: 215° – 218°
Nitrogen: calc. 6.81 percent  found: 6.84 percent
Chlorine: calc. 17.25 percent  found: 16.75 percent.

The preparation of this compound was first mentioned by Parkasch and Venkataraman in J. Scientific and Industrial Research, 13 B, Page 246 (1946). These other workers, however, quoted a melting point of 230° – 231°.

The supposed 1,5-diamino-2,4-dichloroanthraquinone was obtained on hydrolysis (95 percent sulphuric acid, 90° – 95°).

M.p.: 236° – 238° (Lit. 260° – 261°)
Nitrogen: calc. 9.12 percent  found: 8.60 percent
Chlorine: calc. 23.04 percent  found: 23.65 percent.

EXAMPLE 17

14.9 Parts of chlorine were passed into a mixture of 120 parts of dimethylformamide and 23.7 parts 1-methyl-aminoanthraquinone stirred at 0° – 5°. On working up as in Example 1, a dichlorinated 1-methylaminoanthraquinone was obtained as a reddish brown powder.

Yield: 23.2 parts of 76 percent of theoretical.
Chlorine: calc. 23.16 percent  found: 24.5 percent.

EXAMPLE 18

28.4 Parts of chlorine were passed into a mixture of 500 parts by volume of dimethylformamide and 50.4 parts of 5-amino-1,9-isothiazoleanthrone, stirred at 0° – 5°. After working up as in Example 1, 58.5 parts of an orange-yellow powder were obtained.

Chlorine: calc. 22.08 percent  found: 21.8 percent.

The product is therefore a 5-amino-dichloro-1,9-isothiazoleanthrone.

EXAMPLE 19

15 Parts of chlorine were passed into a mixture of 125 parts by volume of dimethylformamide and 24.7 parts of 4-amino-1,9-anthrapyrimidine stirred at 20° – 25°. The mixture was thereafter warmed to 50° – 55°, maintained at that temperature for one hour, allowed to cool and filtered. The residue was washed on the filter with 20 parts of dimethylformamide followed by water. Dichloro-4-amino-1,9-anthrapyrimidine was obtained in a yield of 30.3 parts (96 percent of theoretical). The product was pure after recrystallisation from 1,200 parts of chlorobenzene.

M.p.: 284° – 287°.
Nitrogen: calc. 13,33 percent  found: 13.15 percent
Chlorine: calc. 22.50 percent  found: 22.33 percent.

EXAMPLE 20

56 Parts of 1-aminoanthraquinone are suspended in 250 parts of N-formyl-pyrrolidine, and at 20°-25° within three hours 37.5 parts of dry chlorine are passed into the mixture. At the end of the reaction the suspension is heated to 50°-55° and kept at this temperature for one hour. After cooling to room temperature the product is isolated by filtration. It is washed with 20 parts of N-formyl-pyrrolidine and then with water until free from organic solvent. The yield of the dry product is 75 parts. Melting point 186°-192°. The 1-amino-2,4-dichloroanthraquinone is of similar purity to that of the product of Example 1. Analysis: Chlorine 24.76 percent, nitrogen 5.27 percent.

EXAMPLE 21

56 Parts of 1-aminoanthraquinone are suspended in a mixed solvent made up from 200 parts of chlorobenzene and 75 parts of N,N-di-n-hexylformamide. While being stirred at 20°-25° are introduced into the mixture within three hours 37.5 parts of dry gaseous chlorine. The mass is then heated under stirring to 50°-55° and kept for one hour at this temperature. After cooling to room temperature the 1-amino-2,4-dichloroanthraquinone is filtered and the filtercake washed with 80 parts of chlorobenzene. The filtercake is then steam-distilled to remove completely the chlorobenzene adhering to the product. It is again filtered, washed with water and dried. Yield: 64 parts. Melting point: 189°-194°. The product is of comparable purity to the product prepared according to example 2.

If in the example N,N-di-n-hexylformamide is replaced by N-methyl-N-cyclohexylacetamide the same product is obtained in similar yield and purity.

If in the example N,N-di-n-hexylformamide is replaced by N,N-di-n-octylacetamide the same product is obtained in similar yield and purity.

EXAMPLE 23

56 Parts of 1-aminoanthraquinone are suspended in a mixture of 200 parts of chlorobenzene and 50 parts of 1,4-N,N'-diformylpiperazine. At 20°-25° there are introduced with stirring during three hours 37.5 parts of dry gaseous chlorine. The mixture is then heated to 50°-55° and kept at this temperature for one hour. The 1-amino-2,4-dichloroanthraquinone is filtered at room temperature and washed with 80 parts of chlorobenzene. The filtercake is then distilled with steam to remove any traces of chlorobenzene. It is then again filtered, washed with water and dried. The yield is 62.5 parts, the melting point 189°-194°, which indicates a similar purity for the product as found for the product prepared according to example 2.

If in the example 1,4-N,N'-diformylpiperazine is replaced by N,N,N'N'-tetramethyloxamide the same product is obtained in similar yield and purity.

EXAMPLE 24

1-Aminoanthraquinone (112 parts) are given to a mixture of 500 parts chlorobenzene and 50 parts tetramethyl-urea. The mixture is stirred at 20°-25° for 15 minutes. Subsequently, chlorine gas (72 parts) is introduced. The mixture is cooled to −10° to −5°, and again chlorine gas (58 parts) are introduced. The temperature is allowed to rise at 10° within four hours, and kept at 10°-15° for 10 hours. The reaction mixture is then filtered by suction. The residue is washed with 200 parts chlorobenzene, and then is steam-distilled in order to remove the solvent. The solid is filtered off, washed with water and dried at 120°. An orange powder (145 parts) is obtained which corresponds to the formula

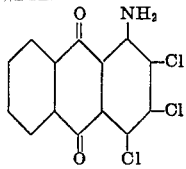

and melts at 240°–244°, or after recrystallisation in chlorobenzene at 259°–261° (orange needles).

The same experiment is repeated using instead of the above-mentioned 50 parts tetramethylurea a mixture of 40 parts dimethylformamide and 10 parts tetramethylurea. The compounds obtained has the same good purity as above.

EXAMPLE 25

1-Aminoanthraquinone (112 parts) is dissolved in a mixture of 500 parts chlorobenzene, 40 parts dimethylformamide and 10 parts tetramethylurea. After 15 minutes chlorine gas (72 parts) is introduced at 20° to 25° over a period of about three hours. The mixture was then cooled to −10° to −5° and chlorine gas (58 parts) is then introduced within three hours and the temperature allowed to rise to 10° and maintained at 10°–15° for 10 hours. The mixture is then slowly heated at 40°–45° within 30 minutes and then kept at this temperature for two hours. 90 Parts of anhydrous, solid sodium carbonate is added to neutralize any hydrochloric acid present. The mixture is then filtered and the residue is then washed with 300 parts of chlorobenzene. The latter is steam-distilled off. Washing with water and drying gives 114 parts of the orange product of the formula

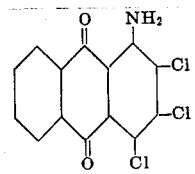

(melting point 254°–255°).

I claim:

1. A process for the manufacture of a chlorine containing aminoanthraquinone, wherein a 1-monoaminoanthraquinone which may be substituted in the anthraquinone nucleus by halogen, hydroxyl, lower alkyl or acylamino where the acyl moiety is acetyl or benzoyl, or which 1-aminoanthraquinone may carry a thiazole or pyrimidine ring, fused thereto, or the 1,5- or 1,8-diaminoanthraquinone is chlorinated by the action of elemental chlorine in the presence of N-methylpyrrolidone or a carboxylic acid amide of the formula

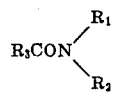

in which $R_1$ and $R_2$ denote lower alkyl or cycloalkyl groups or the groups $R_1$ and $R_2$ together form $-CH_2-CH_2-CH_2-CH_2-$, $-CH_2-CH_2-CH_2-$ or $-CH_2-CH_2-O-CH_2-CH_2-$, and $R_3CO-$ represents the radical of an aliphatic -carboxylic acid; said chlorination being carried out at a temperature of from −60°C up to 50°C until the required amount of chlorine has been taken up.

2. A process as claimed in claim 1, wherein the 1-aminoanthraquinone is used as starting material.

3. A process as claimed in claim 1, wherein the carboxylic acid amide is dimethylformamide.

4. A process as claimed in claim 1, wherein the chlorination is carried out at a temperature below 20°.

5. A process as claimed in claim 1, which is carried out in the presence of an inert organic solvent selected from the group consisting of chlorobenzene, dichlorobenzene and nitrobenzene.

6. A process as claimed in claim 5, wherein chlorobenzene is used as inert organic solvent.

7. A process for the manufacture of a chlorine containing aminoanthraquinone, wherein a 1-monoaminoanthraquinone which may be substituted in the anthraquinone nucleus by a chlorine, bromine, hydroxyl, $C_1-C_2-$alkyl, acetylamino or benzoylamino or which 1-aminoanthraquinone may carry a thiazole or pyrimidine ring fused thereto, or the 1,5- or 1,8-diaminoanthraquinone is subjected to the action of molecular chlorine in the presence of N-methylpyrrolidone or a carboxylic acid amide of the formula

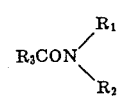

in which $R_1$ and $R_2$ denote $C_1-C_{12}$—alkyl groups or the groups $R_1$ and $R_2$ together may form $-CH_2CH_2CH_2CH_2-$, $-CH_2CH_2CH_2-$ or $-CH_2CH_2-O-CH_2CH_2-$ and $R_3$ is hydrogen, $C_1-C_{10}$—alkyl or $-CONR_1R_2$; said action of chlorine being carried at a temperature of from −60°C up to 50°C until the required amount of chlorine has been taken up.

* * * * *